UNITED STATES PATENT OFFICE.

ELLA JANE MARLETT, OF PENNSBORO, WEST VIRGINIA.

METHOD OF MAKING PIE-FILLING COMPOSITION.

951,504. Specification of Letters Patent. Patented Mar. 8, 1910.

No Drawing. Application filed March 16, 1909. Serial No. 483,737.

*To all whom it may concern:*

Be it known that I, ELLA JANE MARLETT, a citizen of the United States, residing at Pennsboro, in the county of Ritchie and State of West Virginia, have invented new and useful Improvements in Methods of Making Pie-Filling Composition, of which the following is a specification.

This invention relates to a method of making composition for the production of pie fillings.

One object of the invention is to provide a method for producing a composition of this character which may be put up in powdered form for use, and from which the filling may be quickly and conveniently made by simply adding a determined amount of the composition to a proper amount of water and boiling the resultant batter until cooked to the required degree and consistency, where it may be poured into the previously prepared crust.

Another object of the invention is to provide a method for producing a filling composition of this character the basic ingredients of which will form a stock with which any one of a number of flavoring substances may be combined to adapt the composition for use in making different kinds of pies.

In practice of preparing my new composition, I employ the following ingredients, to wit:

| | |
|---|---|
| Granulated sugar | 5 lbs. |
| Cornstarch | 1½ lbs. |
| Eggs | ½ doz. |
| Salt | ½ oz. |
| Saltpeter | 2 grs. |

These ingredients are thoroughly mixed, then exposed, in a suitable receptacle, to a temperature of about 120° F. for a period of about ten minutes, then cooled in an ice-box or refrigerator at freezing temperature or lower, and this operation is repeated the required number of times until the mixture is thoroughly dried, when it is ground to a powder and is then ready for use and may be put up in suitable receptacles for sale and dispensation.

The purpose of first heating and then chilling the composition is to convert a portion of the moisture therein into vapor, whereby through the alternate operations of heating and cooling the composition, the drying or expulsion of the moisture is much more rapidly accomplished. Chilling of the composition after heating also prevents fermentation and prevents the composition from becoming hard or gummy, as it would if all the moisture were expelled by the continued application of heat. By this process also the flavor is retained and its expulsion by the heat prevented.

The composition prepared as above described is suitable for use in the production of a plain custard filling for pies. By adding ground or shredded cocoanut, a cocoanut custard filling is obtained, and in a similar manner by adding different kinds of fruit, fruit juices or extracts, or any equivalent substance to give distinctive taste and flavor, a compound for use in making fillings for many different kinds of pies may be produced.

In the use of the composition for making a filling a suitable quantity of the compound is sifted slowly into a proper amount of hot water contained in a vessel over a fire and the mixture stirred constantly until a batter of the required consistency and cooked to the right degree is obtained. The filling thus prepared is then poured into the previously baked crust and allowed to cool, when the pie is ready to serve.

By the use of my filling stock or composition a thoroughly pure and wholesome filling is obtained and pies may be made therefrom at much less time and expense than under the usual method and with a great saving of labor, as less time is required to make the filling and the process of manufacture allows the crusts to be previously baked and kept on hand until required, an item of importance in large bakeries and other establishments where the crusts may be baked at slack periods of work, and also in households where a large number of pies are made at a time or it is desired to make one or more pies on short notice. As the compound will keep indefinitely its advantages for use in seasons when eggs are high or fresh eggs are difficult to obtain will be appreciated.

In the preparation of the composition any suitable kind of flavoring substance and eggs in any required form in whole or part, may be used, and such variations are to be considered as falling within the spirit and scope of my invention.

Having thus fully described the invention, what is claimed as new, is:—

The herein described method of preparing a composition for the production of pie filling, which consists in combining in an intimate admixture sugar, cornstarch, eggs, salt and saltpeter, repeatedly first heating and then cooling the mixture to freezing temperature until dry, and then grinding the dry product to a powder.

In testimony whereof I affix my signature in presence of two witnesses.

ELLA JANE MaRLETT.

Witnesses:
A. L. DAVIS,
Mrs. C. M. MaRLETT.